(12) United States Patent
Kim et al.

(10) Patent No.: US 12,539,933 B2
(45) Date of Patent: Feb. 3, 2026

(54) BICYCLE

(71) Applicants: Min Ho Kim, Gyeongsangbuk-do (KR); Sang Gil Kim, Gyeongsangbuk-do (KR)

(72) Inventors: Min Ho Kim, Gyeongsangbuk-do (KR); Sang Gil Kim, Gyeongsangbuk-do (KR)

( * ) Notice: Subject to any disclaimer, the term of this patent is extended or adjusted under 35 U.S.C. 154(b) by 620 days.

(21) Appl. No.: 17/916,887

(22) PCT Filed: Jun. 18, 2021

(86) PCT No.: PCT/KR2021/007663
§ 371 (c)(1),
(2) Date: Oct. 4, 2022

(87) PCT Pub. No.: WO2022/085892
PCT Pub. Date: Apr. 28, 2022

(65) Prior Publication Data
US 2023/0159127 A1   May 25, 2023

(30) Foreign Application Priority Data
Oct. 20, 2020   (KR) .................. 10-2020-0136027

(51) Int. Cl.
*B62K 3/00*   (2006.01)
*B62J 1/28*   (2006.01)
(Continued)

(52) U.S. Cl.
CPC .................. *B62K 3/005* (2013.01); *B62J 1/28* (2013.01); *B62J 17/08* (2013.01); *B62J 17/083* (2020.02);
(Continued)

(58) Field of Classification Search
CPC .......... B62K 3/005; B62K 3/04; B62J 17/086; B62J 17/083; B62J 1/28; B62J 17/08;
(Continued)

(56) References Cited

U.S. PATENT DOCUMENTS

| | | | | |
|---|---|---|---|---|
| 846,033 A | * | 3/1907 | Kidney | .................. B62K 3/005 280/288.1 |
| 1,773,996 A | * | 8/1930 | Gordon | .................. B62M 11/06 74/333 |

(Continued)

FOREIGN PATENT DOCUMENTS

| | | |
|---|---|---|
| CN | 2564461 Y | 8/2003 |
| CN | 207141262 U | 3/2018 |

(Continued)

*Primary Examiner* — Timothy Wilhelm
(74) *Attorney, Agent, or Firm* — Young Basile Hanlon & MacFarlane, P.C.

(57) ABSTRACT

The present invention allows a user to ride a bicycle while lying with his/her face down, thereby lowering the center of weight and improving the driving stability, increasing the velocity by reducing the air resistance during driving, and increasing the generation of thrust by easily transferring the force of the user to pedals, and comprises: a frame provided with a front wheel and a rear wheel such that the user can ride while lying with his/her face down; and an acceleration means installed on the rear wheel and generating power and acceleration according to pedaling.

4 Claims, 8 Drawing Sheets

(51) Int. Cl.
  *B62J 17/08* (2020.01)
  *B62J 17/083* (2020.01)
  *B62K 3/04* (2006.01)
  *B62M 1/38* (2013.01)
  *B62M 11/02* (2006.01)
  *B62M 11/06* (2006.01)
  *F16H 1/06* (2006.01)
  *F16H 1/20* (2006.01)

(52) U.S. Cl.
  CPC ............... *B62K 3/04* (2013.01); *B62M 1/38* (2013.01); *B62M 11/02* (2013.01); *B62M 11/06* (2013.01); *F16H 1/20* (2013.01); *F16H 1/06* (2013.01)

(58) Field of Classification Search
  CPC ........ B62M 1/38; B62M 11/02; B62M 11/06; F16H 1/06; F16H 1/20
  See application file for complete search history.

(56) References Cited

U.S. PATENT DOCUMENTS

| | | | | | |
|---|---|---|---|---|---|
| 3,513,725 | A | * | 5/1970 | Keizo | B62M 11/02 475/259 |
| 3,854,754 | A | * | 12/1974 | Jablonski | A61G 5/1051 280/242.1 |
| 4,411,443 | A | * | 10/1983 | Pollard | B62J 17/083 280/288.1 |
| 4,694,708 | A | * | 9/1987 | Hartmann | B62M 1/38 475/349 |
| 4,735,430 | A | * | 4/1988 | Tomkinson | F16H 15/38 475/216 |
| 4,838,568 | A | * | 6/1989 | Arroyo | B62M 1/12 280/288.1 |
| 5,732,963 | A | * | 3/1998 | White | B62M 1/20 280/288.1 |
| 5,895,336 | A | * | 4/1999 | Yoo | B62M 11/145 280/238 |
| 5,915,710 | A | * | 6/1999 | Miller | B62K 3/005 280/288.1 |
| 6,050,584 | A | * | 4/2000 | Sibson | B62M 9/04 280/288.4 |
| D439,206 | S | * | 3/2001 | Torres | D12/111 |
| 6,199,884 | B1 | * | 3/2001 | Doroftei | B62M 1/30 280/288.1 |
| 6,497,426 | B2 | * | 12/2002 | VanPelt | B62K 13/02 280/288.1 |
| 8,162,344 | B2 | * | 4/2012 | Hoogendoorn | F16C 11/045 384/262 |
| 8,336,893 | B2 | * | 12/2012 | Grossberger | B62K 3/005 280/242.1 |
| 8,475,327 | B2 | * | 7/2013 | Seo | B62M 11/02 475/343 |
| 8,651,505 | B2 | * | 2/2014 | Williams | B62K 3/10 280/281.1 |
| 9,677,650 | B2 | * | 6/2017 | Nichols | B62M 6/45 |
| 9,981,716 | B2 | * | 5/2018 | Suzuki | F16H 1/20 |
| 10,399,635 | B2 | * | 9/2019 | Yamamoto | B62M 6/50 |
| 11,014,627 | B2 | * | 5/2021 | Hawkins | B62M 6/45 |
| 2004/0051274 | A1 | * | 3/2004 | Urban | B62K 3/005 280/281.1 |
| 2006/0175794 | A1 | * | 8/2006 | Chen | B62M 11/02 280/260 |
| 2011/0226090 | A1 | * | 9/2011 | Hsu | F16H 37/027 74/810.1 |
| 2017/0023103 | A1 | * | 1/2017 | Liu | F16H 1/20 |
| 2017/0334510 | A1 | * | 11/2017 | Petrov | B62J 17/00 |

FOREIGN PATENT DOCUMENTS

| | | |
|---|---|---|
| ES | 2070684 B1 * | 2/1997 |
| KR | 200462638 Y1 | 9/2012 |
| KR | 20140125023 A | 10/2014 |
| KR | 101912557 B1 | 10/2018 |
| KR | 101999438 B1 | 7/2019 |
| KR | 20190143577 A | 12/2019 |

\* cited by examiner

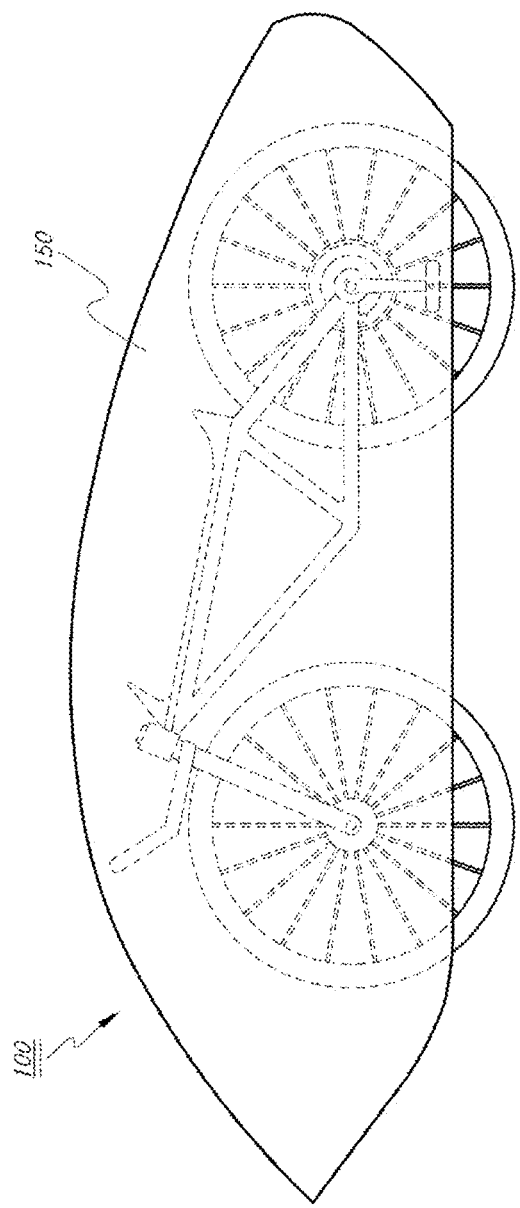

BICYCLE

CROSS-REFERENCE TO RELATED APPLICATION(S)

This application claims priority to and the benefit of Korean Application Patent Serial No. 10-2020-0136027, filed Oct. 20, 2020, the entire disclosure of which is hereby incorporated by reference.

TECHNICAL FIELD

The present invention relates to a bicycle, and more particularly, to an improved bicycle that allows a user to ride while completely lying with a face of the user down, thereby reducing an air resistance in a driving process, lowering a center of gravity to ensure stability, and increasing a velocity through an acceleration device.

BACKGROUND

In general, a bicycle is configured such that wheels are mounted on front and rear sides of a frame formed of a metal or nonferrous metal material, a steering wheel is mounted on a front side, a seating saddle (seat) is installed at a center, and a power generation device for generating a power required for driving is installed between a lower side of the saddle and a rear axle.

The technical contents of configurations of the general bicycle described above will be given through patent documents as follows.

Patent Document 1, which is Patent No. 10-1912557-0000, discloses a configuration including: a crankshaft 120 rotatably coupled to a frame 110; a front sprocket 130 coupled to one side of the crankshaft 120 to rotate together with the crankshaft 120 when the crankshaft 120 rotates; a first crank arm 131 located outside the front sprocket 130, and coupled to the one side of the crankshaft 120 to rotate together with the crankshaft 120 when the crankshaft 120 rotates; a first fixed sprocket 141 fixedly coupled to the frame 110 with an aim member 1411 interposed therebetween, located between the front sprocket 130 and the first crank aim 131, and formed at a center thereof with a first hole 1412, in which the crankshaft 120 passes through the first hole 1412, and the first fixed sprocket 141 is fixed so as not to rotate even when the crankshaft 120 rotates; a first rotation sprocket 142 rotatably coupled to an end of the first crank aim 131, and including protrusions formed in a ratio of 1:1 with respect to the first fixed sprocket 141; a first auxiliary crank aim 151 rotatably coupled to the end of the first crank aim 131, and fixed to the first rotation sprocket 142 to rotate together with the first rotation sprocket 142; a first power transmission member 161 for connecting the first fixed sprocket 141 to the first rotation sprocket 142 so as to transmit a power; a second crank aim 132 coupled to an opposite end of the crankshaft 120 to rotate together with the crankshaft 120 when the crankshaft 120 rotates; a second fixed sprocket 143 fixedly coupled to the frame 110, formed at a center thereof with a second hole 1432, in which the crankshaft 120 passes through the second hole 1432, and the second fixed sprocket 143 is fixed to the frame 110 so as not to rotate even when the crankshaft 120 rotates; a second rotation sprocket 144 rotatably coupled to an end of the second crank aim 132, and including protrusions formed in a ratio of 1:1 with respect to the second fixed sprocket 143; a second auxiliary crank aim 152 rotatably coupled to the end of the second crank aim 132, and fixed to the second rotation sprocket 144 to rotate together with the second rotation sprocket 144; and a second power transmission member 162 for connecting the second fixed sprocket 143 to the second rotation sprocket 144 to transmit the power.

Patent Document 2, which is Patent No. 10-1999438-0000, discloses a configuration including: a front frame; and a rear frame bonded to the front frame, wherein the front frame includes: head and seat tubes arranged in a longitudinal direction; and a center tube arranged in a lateral direction and bonded to the head and seat tubes to connect the head tube to the seat tube, the rear frame includes: a seat stay connected to an upper end of the seat tube and a rear wheel; and a chain stay connected to a lower end of the seat tube and the rear wheel, the seat tube includes an upper seat tube, a middle seat tube, and a lower seat tube, the head tube, the center tube, and the middle seat tube are formed of fiber-reinforced plastic, the upper seat tube, the lower seat tube, and the rear frame are formed of a metal, and the center tube includes: an outer shell having a width that is gradually widened from a middle point of the center tube toward the head tube and the seat tube, and having a parabolic sectional shape; and a rib formed on an inner upper portion of the outer shell in a vertical direction, and having a plurality of holes.

SUMMARY

Among the related art as described above, Patent Document 1 relates to a bicycle driving device with increased torque, in which a rotational trajectory of a pedal is moved forward to allow the pedal to be spaced apart from a crankshaft when the pedal is in a front position, so that a strong force may be transmitted to the crankshaft by using a principle of leverage, and Patent Document 2 relates to a configuration in which a part of a frame is reinforced with fiber-reinforced plastic so that a light weight and excellent mechanical strength may be obtained.

According to a bicycle to which the related art is applied, a frame may allow a hip of a user to make close contact with a saddle provided at a center so as to maintain a state in which an upper body of the user is inclined forward, steering may be performed by gripping a handle with both hands, and a power (thrust) may be generated through pedaling by using both feet so as to perform driving.

Because of such a sitting posture, a center of gravity may be raised to cause instability during a driving process, resulting in poor steering performance, and there may be a high risk of negligent accidents causing physical damage to the user due to frequent falls easily caused by a concavo-convex portion and the like.

Since there is a limitation even when the upper body is bent forward during the driving, there may be an influence of wind to cause a severe resistance, and it will be apparent that the resistance has a negative influence on shortening of a record especially in a case of a racing bicycle.

In addition, since generation of a power for driving the bicycle is performed by a combination of a chain gear and a chain, there may be a limitation even when acceleration is performed through transmission, so that there may be a limitation in enjoying a speedy game or a speed.

In particular, since a main chain gear fixed to a pedal shaft installed at a center of a frame and a driving chain gear mounted to a rear wheel shaft are connected to each other through a chain so as to transmit a power, a power loss that prevents a force of a user from being intactly transmitted may occur, which acts as a cause of sudden physical fatigue of users.

In a process of use, considerable stress may act to the chain to cause the train to break, and it may not be free from various problems caused by the breakage of the chain, such as occurrence of a negligent accident, and much time and money required for repair and maintenance.

Accordingly, to solve the problems described above, according to the present invention, a bicycle includes: a frame 110 on which a front wheel 101 and a rear wheel 102 are mounted to allow a user to ride; and an acceleration device 130 mounted on the rear wheel to generate a power and perform acceleration according to pedaling, so that the user may ride and drive the bicycle while lying with a face of the user down, thereby lowering a center of gravity to improve driving stability, reducing an air resistance in a driving process to increase a velocity, and easily transmitting a force of the user to pedals to increase generation of thrust.

According to the present invention, the frame may be configured such that the user rides while lying with the face of the user down, so that the center of gravity can be lowered to increase the stability, and the resistance can be reduced in the driving process to improve driving performance.

According to the present invention, various effects can be achieved: a velocity may be increased through an acceleration device that is directly connected to the pedal at a center of a rear axle so that a power loss can be minimized; a cap may be mounted on the frame so as to be driven so that an advanced bicycle can be provided; and the like.

BRIEF DESCRIPTION OF THE DRAWINGS

FIG. 8 is a view showing another example of a state in which a cap is mounted on the bicycle to which the technology of the present invention is applied.

DETAILED DESCRIPTION

Figure 1:
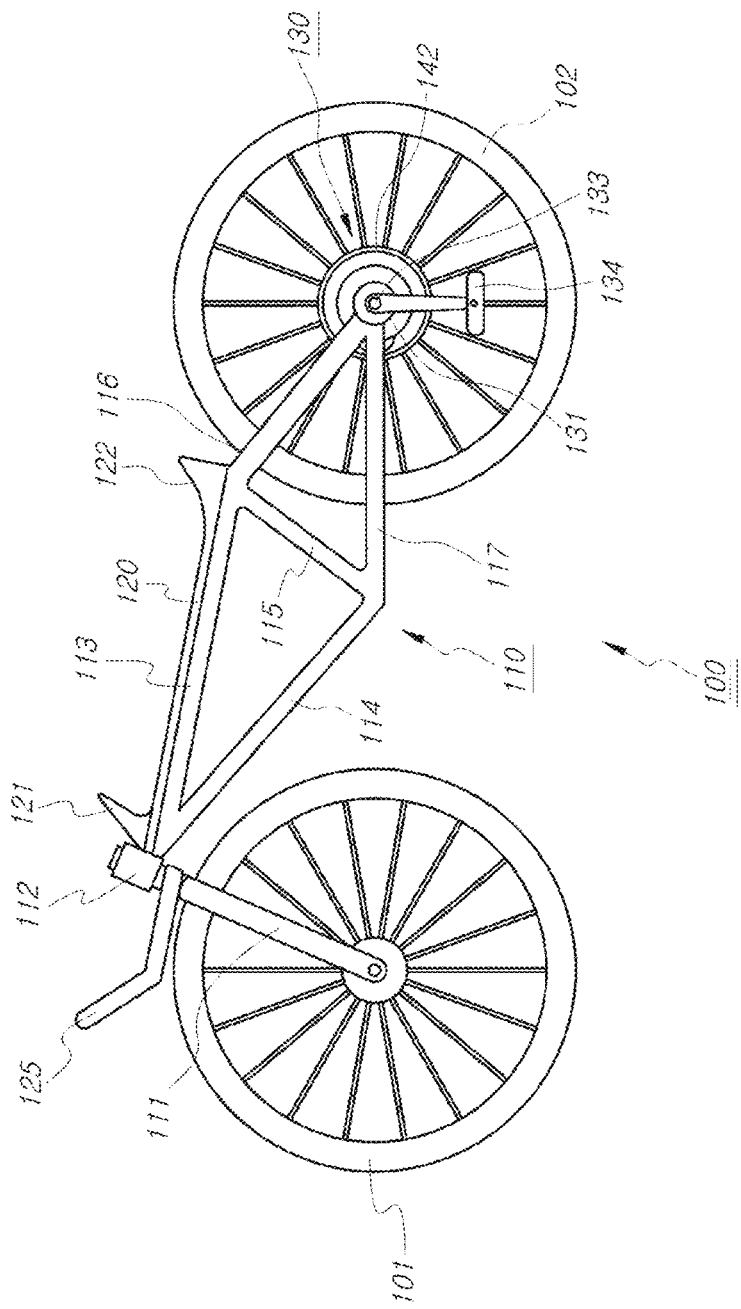
FIG. 1 is a view illustrating a configuration of a bicycle to which the technology of the present invention is applied.
Figure 2:
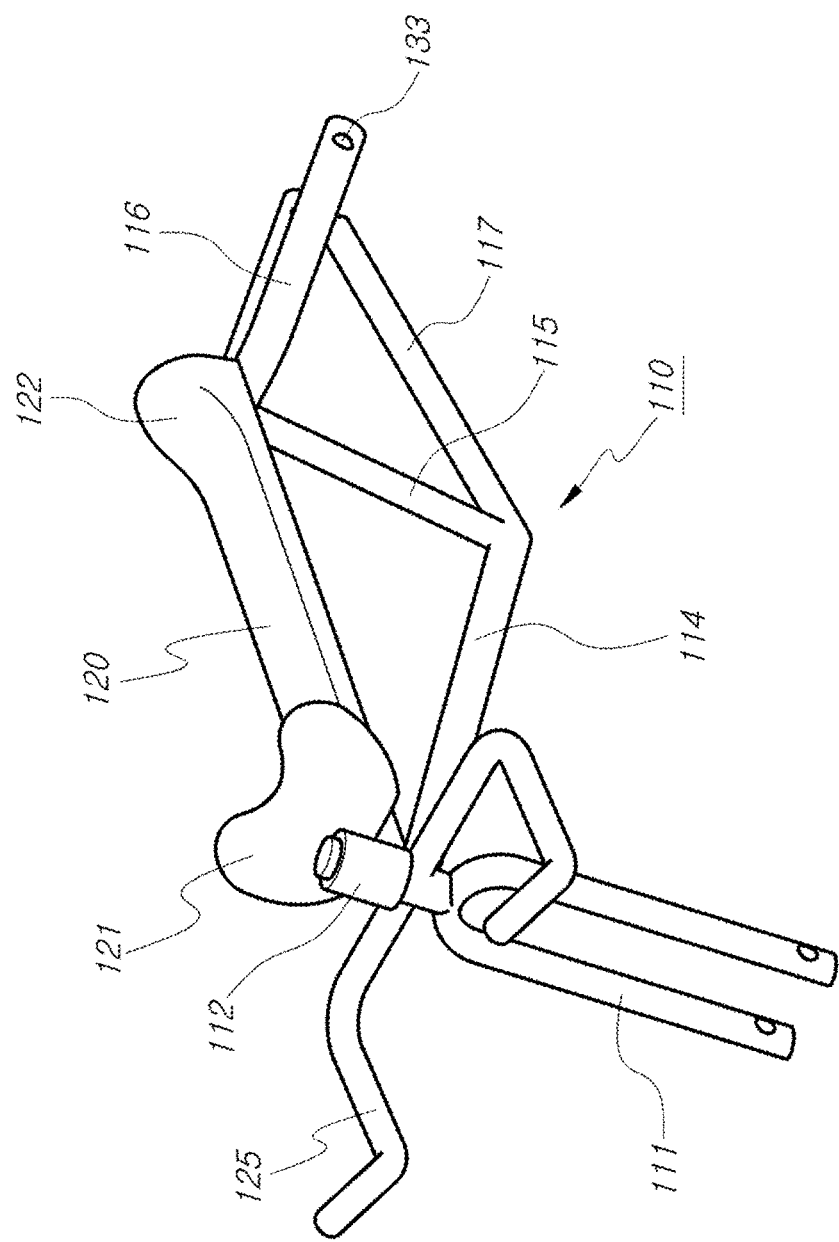
FIG. 2 is a perspective view showing an overall extracted configuration of a frame of the bicycle to which the technology of the present invention is applied.
Figure 3:
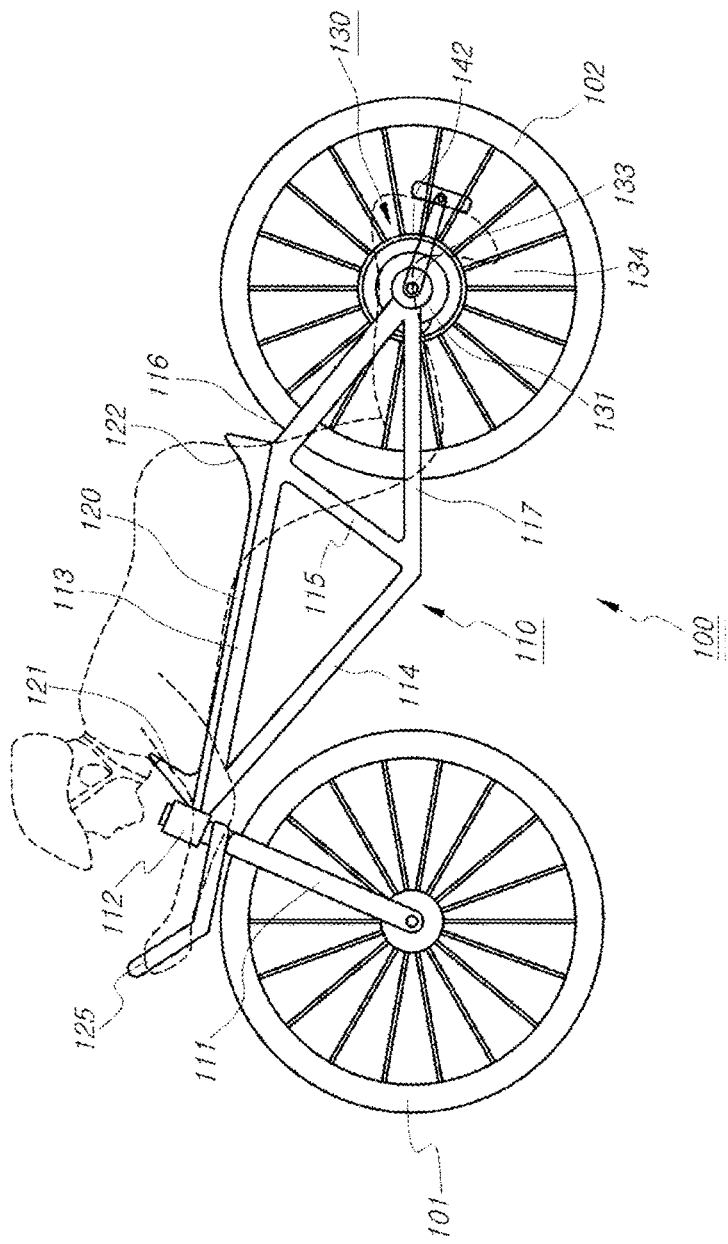
FIG. 3 is a view showing an example of a state in which a user rides on the frame of the bicycle to which the technology of the present invention is applied.
Figure 4:
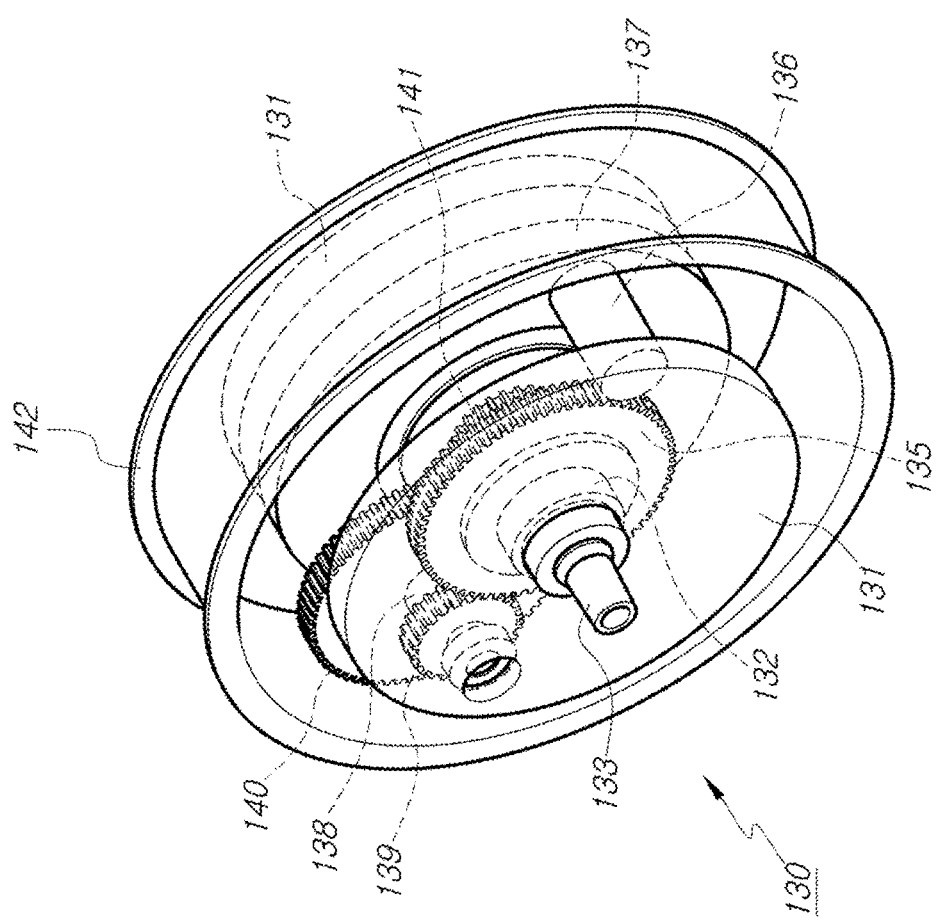
FIG. 4 is a view showing an overall extracted configuration of an acceleration device of the bicycle to which the technology of the present invention is applied.
Figure 5:
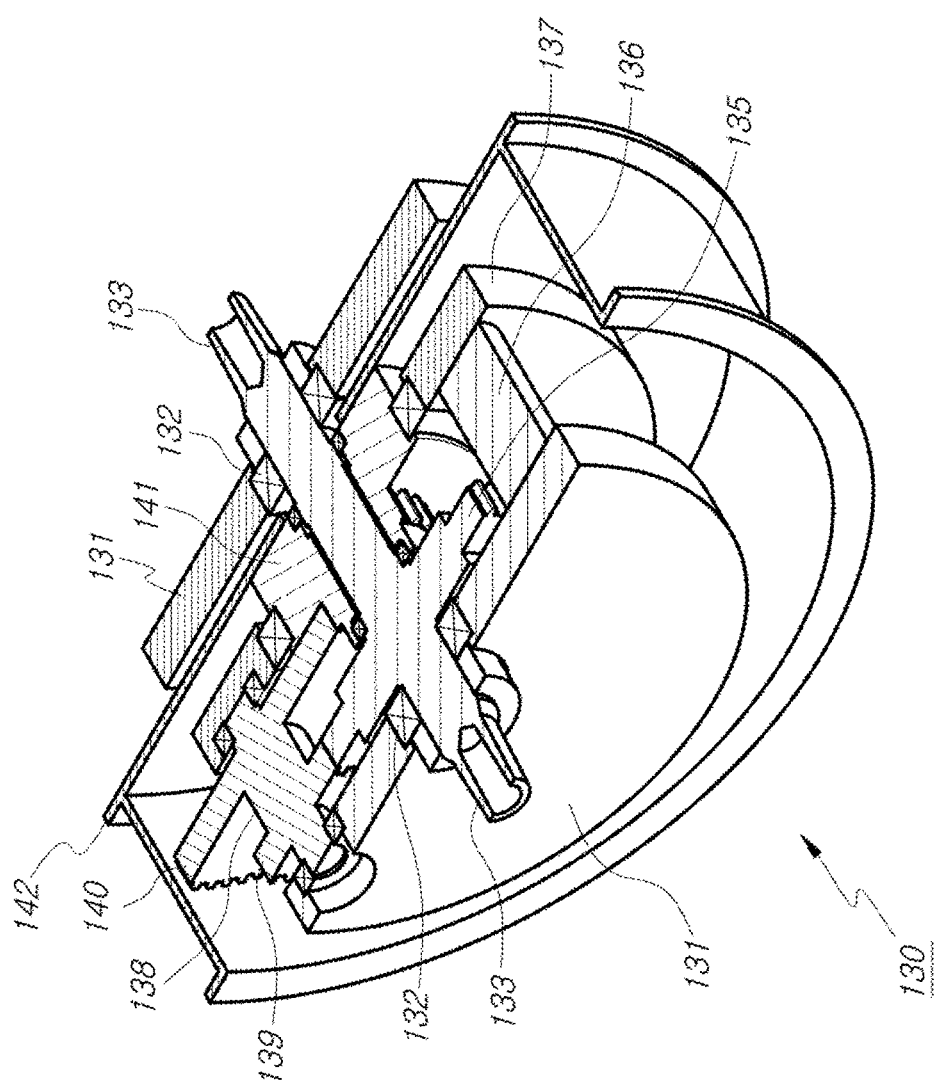
FIG. 5 is a cutaway perspective view showing an extracted configuration of the acceleration device of the bicycle to which the technology of the present invention is applied.
Figure 6:
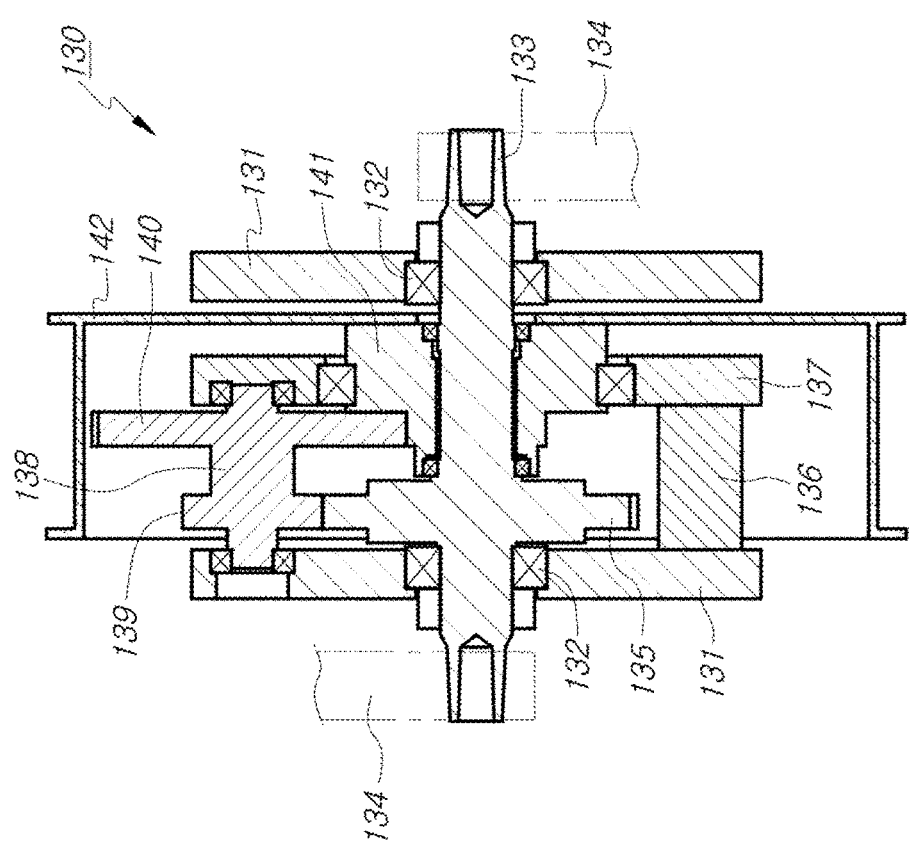
FIG. 6 is a sectional view showing an extracted configuration of the acceleration device of the bicycle to which the technology of the present invention is applied.
Figure 7:
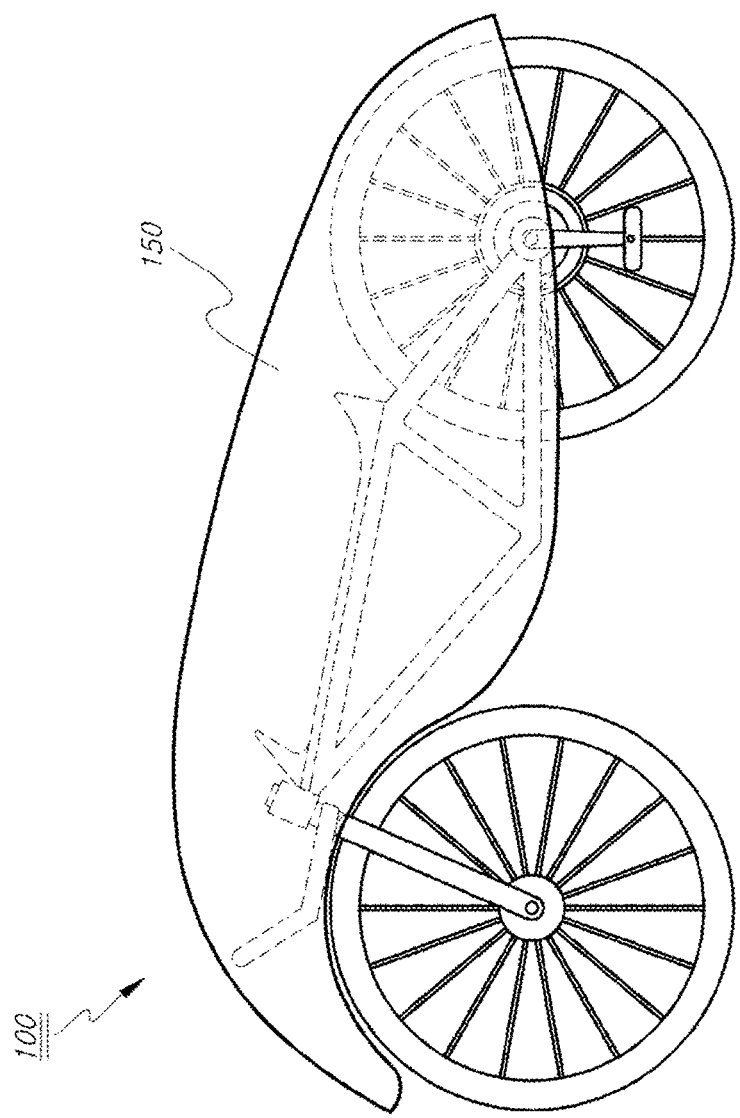
FIG. 7 is a view showing an example of a state in which a cap is mounted on the bicycle to which the technology of the present invention is applied.

A bicycle 100 to which the technology of the present invention is applied may include: a frame 110 on which a front wheel 101 and a rear wheel 102 are mounted to allow a user to ride; and an acceleration device 130 mounted on the rear wheel to generate a power and perform acceleration according to pedaling.

According to the frame 110, a top tube 113 may be connected to an upper rear side of a head tube 112 on which a stanchion tube 111 having a lower end on which the front wheel 101 is mounted is rotatably mounted, and a down tube 114 may be connected to a front lower end of the top tube 113 so as to be inclined rearward.

A center tube 115 may be connected to rear ends of the top tube 112 and the down tube 114 in a longitudinal direction, a rear tube 116 may be connected to an upper end of the center tube 115 so as to be inclined downward to a rear side of the center tube 115, a bottom tube 117 may extend horizontally from a lower end of the center tube 115 to the rear side of the center tube 115 so as to be connected to the lower end of the center tube 115, and rear ends of the rear and bottom tubes 116 and 117 may make contact with each other to allow the rear wheel 102 to be mounted.

The frame 110 may be preferably formed of a material such as reinforced aluminum or carbon for weight reduction, and a flat part 120 having a width of 14 to 40 cm may be formed on a top surface of the top tube 113 to stably support chest and stomach regions, which correspond to an upper body of the user, such that the chest and stomach regions may consecutively make contact with the flat part 120.

A shoulder hook 121 may be integrally formed on a front side of the top tube 113 to receive and support both shoulders of the user who lies with the face of the user down, and a seat part 122 for supporting a hip portion of the user may integrally protrude upward from a rear end of the top tube 113 so as to be inclined rearward.

It will be natural to provide a buffer pad on surfaces of the flat part 120, the shoulder hook 121, and the seat part 122 to absorb a shock and vibration while increasing close contact sensation.

A handle 125 may be mounted on both sides of an upper end of the stanchion tube 111 so as not to interfere with the head tube 112 to enable steering, and since a shape and a form of the handle 125 may vary, the handle 125 may not be specified by any one shape and form.

The acceleration device 130 may be configured such that a pedal shaft 133 provided on a main bracket 131, which is mounted on ends of the rear and bottom tubes 116 and 117, with a one-way bearing 132 interposed therebetween to transmit a power in a forward direction and perform idling in a rearward direction may be maintained, and pedals 134 may be coupled to both sides of the pedal shaft 133, respectively.

A driver gear 135 for generating the power through a rotation of the pedal shaft 133 may be mounted or integrally formed on one side of the pedal shaft 133, the driver gear 135 may be engaged with a mediating gear 139 provided on one side of a switching shaft 138 provided on an auxiliary bracket 137, which is maintained between main brackets 131 by a supporter 136, with a bearing interposed therebetween, and an acceleration gear 140 may be mounted on a lateral side of the mediating gear 139.

The acceleration gear 140 may be engaged with a driving gear 141 mounted on the pedal shaft 133, which is provided on a lateral side of the driver gear 135, with a bearing interposed therebetween to output an accelerated power, and a hub 142 of the rear wheel 102 may be fixed to the driving gear 141 to drive the rear wheel 102.

The driver gear 135 may be larger than the mediating gear 139, and the acceleration gear 140 may be larger than each of the driver gear 135 and the mediating gear 139, so that the driving gear 141, which is the smallest, may rotate rapidly, it will be natural that a gear ratio of the respective gears is calculated in consideration of a desired velocity, and a brake disc for performing braking may be mounted on an outer surface of the hub 142.

MODE FOR INVENTION

In a case of riding a bicycle 100, a user may take a posture of lying with a face of the user down to allow stomach and chest regions of the user to make close contact with a flat part 120 formed on a top surface of a top tube 113, a shoulder may make close contact with a shoulder hook 121 formed on a front side of the top tube 113, and a hip may make close contact with a seat part 122 formed on a rear side of the top tube 113.

Naturally, both hands may grip a handle 125 formed on both sides of an upper end of a stanchion tube 111 to adjust a direction, and in a case of performing driving in this state, the user may kick a ground with both feet to move forward so as to perform the pedaling, or the user may perform pedaling with one foot while another foot is placed on the ground and perform the pedaling with both feet while the driving is performed.

When the driving starts, a driver gear 135 may rotate according to the pedaling, a power of the driver gear may be transmitted through a mediating gear 139 and an acceleration gear 140, which are mounted on a switching shaft 138, and finally, regardless of a rotation of a pedal shaft 133, a velocity may be increased and output so as to be faster than a pedaling velocity of the user through a driving gear 141 mounted on the pedal shaft 133.

Since a hub 142 is mounted on the driving gear 141, a rear wheel 102 may finally rotate to perform the driving, and if necessary, a cap 150 may be mounted on an outside of the frame 110 to enable the driving even in rain and snow and enable racing for competing for a velocity.

In particular, according to the present invention, the user may maintain a state of lying with a face of the user down so that a comfortable posture may be maintained, and a lower body of the user may be used to intactly transmit a force without a loss of the force during the pedaling so that power transmission and power generation efficiency may be maximized.

INDUSTRIAL APPLICABILITY

The present invention described above has various advantages that a user may ride and drive a bicycle 100 while lying with a face of the user down, thereby lowering a center of gravity to improve driving stability, reducing an air resistance in a driving process to increase a velocity, and easily transmitting a force of the user to pedals 134 to increase generation of thrust.

The invention claimed is:

1. A bicycle comprising:
a frame on which a front wheel and a rear wheel are mounted to allow a user to ride while lying with a face of the user down; and
an acceleration device mounted on the rear wheel to generate a power and perform acceleration according to pedaling; wherein the acceleration device includes:
a main bracket mounted on ends of rear and bottom tubes;
a pedal shaft provided on the main bracket with a one-way bearing interposed between to transmit a power in a forward direction and perform idling in a rearward direction;
pedals coupled to both sides of the pedal shaft, respectively;
a driver gear provided on one side of the pedal shaft to generate the power through a rotation of the pedal shaft;
a switching shaft provided on an auxiliary bracket, which is maintained between main brackets by a supporter, with a bearing interposed therebetween;
a mediating gear provided on one side of the switching shaft so as to be engaged with the driver gear;
an acceleration gear mounted on a lateral side of the mediating gear;
a driving gear provided on the pedal shaft, which is provided on a lateral side of the driver gear, with a bearing interposed therebetween so as to be engaged with the acceleration gear to output an accelerated power; and
a hub fixed to the driving gear and mounted at the ends of the rear and bottom tubes to drive the rear wheel,
wherein the driver gear, the switching shaft, the mediating gear, the acceleration gear and the driving gear are provided within the hub, and the pedal shaft passes through central portions of the hub, the main bracket and the rear wheel.

2. The bicycle of claim 1, wherein the frame includes:
a stanchion tube having a lower end on which the front wheel is mounted;
a head tube on which the stanchion tube is rotatably mounted;
a top tube connected to an upper rear side of the head tube;
a down tube connected to a front lower end of the top tube so as to be inclined rearward;
a center tube connected to rear ends of the top tube and the down tube in a longitudinal direction;
a rear tube connected to an upper end of the center tube so as to be inclined downward to a rear side of the center tube; and
a bottom tube extending horizontally from a lower end of the center tube to the rear side of the center tube so as to be connected to the lower end of the center tube.

3. The bicycle of claim 2, further comprising:
a flat part formed on a top surface of the top tube to stably support chest and stomach regions, which correspond to an upper body of the user, such that the chest and stomach regions consecutively make contact with the flat part;
a shoulder hook formed on a front side of the top tube to receive and support both shoulders of the user who lies with the face of the user down;
a seat part protruding upward from a rear end of the top tube so as to be inclined rearward to support a hip portion of the user; and
a handle mounted on both sides of an upper end of the stanchion tube so as not to interfere with the head tube.

4. The bicycle of claim 1, wherein a cap is further mounted on an outside of the frame.

* * * * *